(12) United States Patent
Zhang et al.

(10) Patent No.: US 11,746,608 B2
(45) Date of Patent: Sep. 5, 2023

(54) METHOD AND DEVICE FOR HOLE CLEANING AND DRILLING HYDRAULIC DESIGN

(71) Applicant: Halliburton Energy Services, Inc., Houston, TX (US)

(72) Inventors: Feifei Zhang, Houston, TX (US); Andrey Filippov, Houston, TX (US); Jianxin Lu, Bellaire, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1212 days.

(21) Appl. No.: 16/091,036

(22) PCT Filed: May 13, 2016

(86) PCT No.: PCT/US2016/032511
§ 371 (c)(1),
(2) Date: Oct. 3, 2018

(87) PCT Pub. No.: WO2017/196372
PCT Pub. Date: Nov. 16, 2017

(65) Prior Publication Data
US 2019/0120002 A1 Apr. 25, 2019

(51) Int. Cl.
*E21B 21/08* (2006.01)
*F04B 49/06* (2006.01)
(Continued)

(52) U.S. Cl.
CPC ............ *E21B 21/08* (2013.01); *B08B 9/0433* (2013.01); *B65G 53/10* (2013.01); *B65G 53/66* (2013.01);
(Continued)

(58) Field of Classification Search
CPC .......... E21B 21/08; E21B 37/00; E21B 41/00; E21B 43/12; E21B 2200/20; G06F 30/20;
(Continued)

(56) References Cited

U.S. PATENT DOCUMENTS 5,327,984 A 7/1994 Rasi et al.
6,401,838 B1 6/2002 Rezmer-Cooper
(Continued)

OTHER PUBLICATIONS

Costa, Suzana Santos, et al. "Simulation of transient cuttings transportation and ECD in wellbore drilling." Europec/EAGE Conference and Exhibition. OnePetro, 2008. pp. 1-9. (Year: 2008).*
(Continued)

*Primary Examiner* — John E Johansen
(74) *Attorney, Agent, or Firm* — K&L Gates LLP

(57) ABSTRACT

A system includes a processor. The processor estimates a pattern of a flow of a mixture of drilling fluid and cuttings in an annulus of a wellbore. The flow is estimated as a stationary bed flow, a dispersed flow, or a transitional flow relative to the stationary bed and dispersed flows. The processor estimates parameters based on the estimated pattern of the flow, and determines a plurality of dimensionless parameters including a first dimensionless parameter corresponding to an effect of turbulence on the flow and a second dimensionless parameter corresponding to an effect of gravity on the flow, based on the estimated parameters. The processor characterizes the pattern of the flow as the stationary bed flow, the dispersed flow, or the transitional flow, based on the dimensionless parameters, and models the flow based on the estimated pattern if it is determined that the characterized pattern matches the estimated pattern.

14 Claims, 7 Drawing Sheets

(51) Int. Cl.

| | |
|---|---|
| *F04B 51/00* | (2006.01) |
| *F04B 47/00* | (2006.01) |
| *G06F 17/11* | (2006.01) |
| *F04B 7/00* | (2006.01) |
| *B65G 53/10* | (2006.01) |
| *E21B 43/12* | (2006.01) |
| *G05B 19/44* | (2006.01) |
| *G06F 30/20* | (2020.01) |
| *B65G 53/66* | (2006.01) |
| *B08B 9/043* | (2006.01) |
| *G05B 17/02* | (2006.01) |
| *E21B 37/00* | (2006.01) |
| *E21B 41/00* | (2006.01) |
| *G06F 111/10* | (2020.01) |
| *G06F 113/14* | (2020.01) |

(52) U.S. Cl.
CPC .............. *E21B 37/00* (2013.01); *E21B 41/00* (2013.01); *E21B 43/12* (2013.01); *F04B 7/00* (2013.01); *F04B 49/065* (2013.01); *F04B 51/00* (2013.01); *G05B 17/02* (2013.01); *G05B 19/44* (2013.01); *G06F 17/11* (2013.01); *G06F 30/20* (2020.01); *E21B 2200/20* (2020.05); *F04B 47/00* (2013.01); *G06F 2111/10* (2020.01); *G06F 2113/14* (2020.01)

(58) Field of Classification Search
CPC .. G06F 17/11; G06F 2113/14; G06F 2111/10; B08B 9/0433; B65G 53/10; B65G 53/66; F04B 7/00; F04B 49/065; F04B 51/00; F04B 47/00; G05B 19/44
USPC ....................................................... 703/9, 10
See application file for complete search history.

(56) References Cited

U.S. PATENT DOCUMENTS

| | | |
|---|---|---|
| 2005/0126777 A1 | 6/2005 | Rolovic et al. |
| 2010/0018701 A1 | 1/2010 | Peter et al. |
| 2011/0232913 A1* | 9/2011 | Sun ........................ G01V 11/00 166/369 |
| 2012/0303281 A1 | 11/2012 | Hon et al. |
| 2013/0090855 A1 | 4/2013 | Rasmus et al. |

OTHER PUBLICATIONS

Zhang, Feifei, et al. "Pressure profile in annulus: Solids play a significant role." Journal of Energy Resources Technology 137.6. pp. 1-10. (Year: 2014).*

Li, Jeff, and Bernard Luft. "Overview solids transport study and application in oil-gas industry-theoretical work." International petroleum technology conference. OnePetro, 2014. pp. 1-35. (Year: 2014).*

Feifei Zhang, Andrey Filippov, and Jianxin Lu, Dimensionless Flow Regime Mapping and Modeling for Particle Transport in Fluid, pp. 231-239, Halliburton, Houston, Texas.

Filippo Chiodii, Philippe Claudin L and Bruno Andreotti, A two-phase flow model of sediment transport: transition from bedload to suspended load, Laboratoire de Physique et Mecanique des Milieux Heterogenes, (PMMH UMR 7636 ESPCI—CNRS—University Paris Diderot—University P. M. Curie) 10 rue Vauquelin, 75005 Paris, France, revised May 2, 2014; accepted Jul. 21, 2014, Fluid Meeh. (2014), vol. 755, pp. 561-581. © Cambridge University Press 2014 doi: 10.1017 /jfm.2014.422.

Hengfu Xiang, A New Model of Cuttings Bed Height for Horizontal Small Bore Pipes without Rotating Drill-Pipe, China University of Petroleum, Qingdao 266580, China, Qingdao, Shandong, 266580, P.R. China.

Hyun Cho, Spe, Subhash, N. Shah, Spe, and Samuel 0. Osisanya, Spe, Mewbourne School of Petroleum and Geological Engineering, The University of Oklahoma, A Three-Segment Hydraulic Model for Cuttings Transport in Horizontal and Deviated Wells, pp. 1-16, SPE/Petroleum Society of CIM 65488, Society of Petroleum Engineers.

V.C. Kelessidis, Spe. and G.E. Bandelis, Technicai U. of Creie, Flow Patterns and Minimum Suspension Velocity for Efficient Cuttings Transport in Horizontal and Deviated Wells in Coiled-Tubing Drilling, pp. 213-227, Dec. 2004 SPE Drilling & Completion.

International Searching Authority, Patent Cooperation Treaty, International Search Report and Written Opinion of the International Searching Authority, International Application No. PCT/US2016/032511, which is a PCT parent to the instant application, Mar. 14, 2017.

* cited by examiner

METHOD AND DEVICE FOR HOLE CLEANING AND DRILLING HYDRAULIC DESIGN

BACKGROUND

In industries such as the drilling industry, a flow conduit may include an annular structure such as an annulus around a drill string in a wellbore. The flow within such a flow conduit may include multiple phases. The phases include a liquid phase (e.g., drilling fluid) and a particle phase (e.g., cuttings formed by a drill bit of the drill string during drilling). During operation, various characteristics and/or parameters regarding the flow may be monitored. These parameters may include bottom hole pressure (BHP) and friction pressure loss in the wellbore. Accurate monitoring and control of the BHP may be critical in operations involving, for example, drilling in a narrow mud window zone and/or Managed Pressure Drilling (MPD).

Pressure loss in the wellbore may be due to the effects of cuttings and/or friction effects. For example, when the flow rate of the drilling fluid is low, the concentration of cuttings in the annulus may be sufficiently high to lead to high pressure loss. As another example, when the flow rate of the drilling fluid is high, friction loss may become high, which can also lead to high pressure loss.

BRIEF DESCRIPTION OF THE DRAWINGS

There are disclosed in the drawings and the following description methods and systems employing parameters (e.g., dimensionless parameters) for determining characteristics of a flow in an annular structure (e.g., an annulus in a wellbore). In the drawings.

Figure 1:
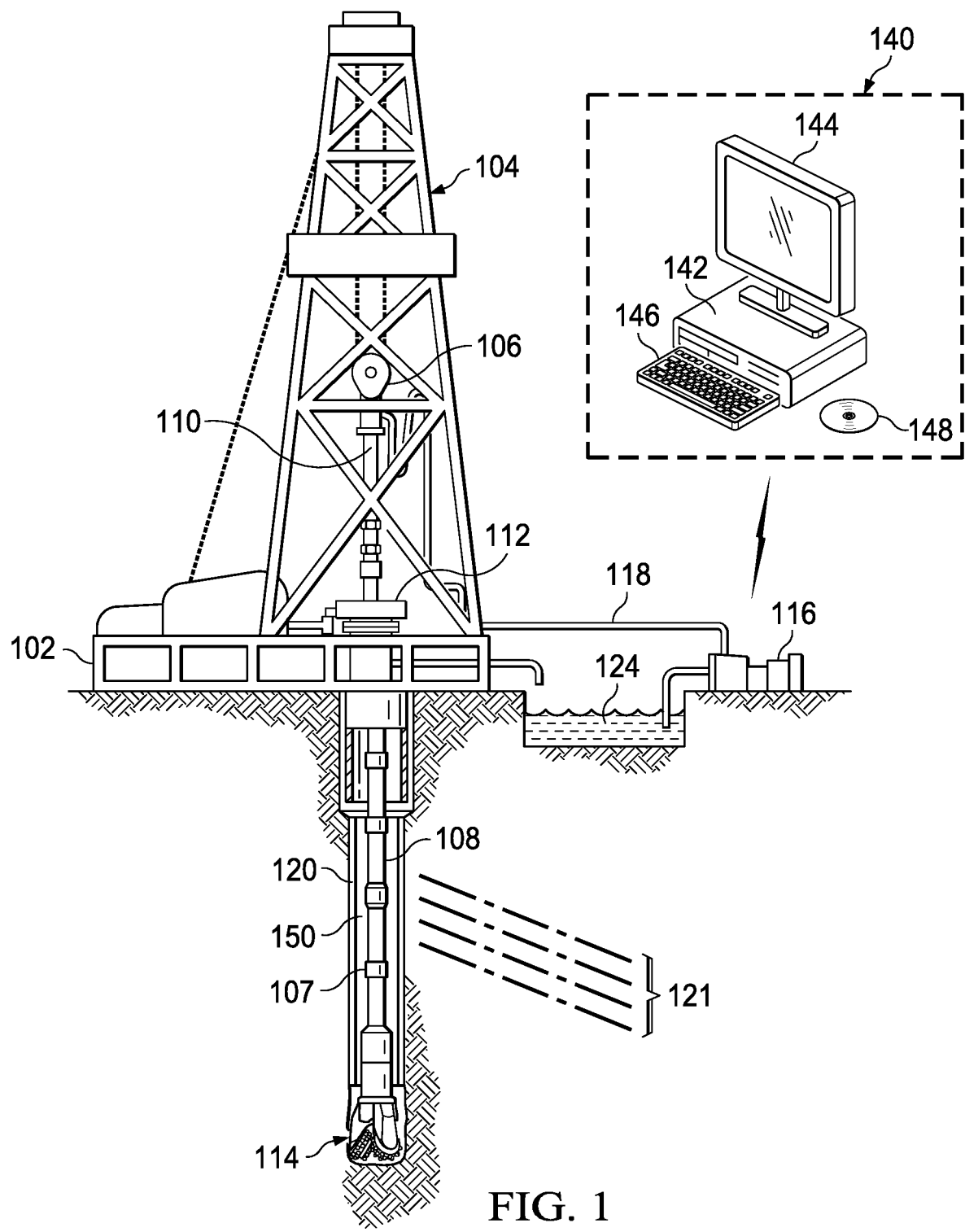
FIG. 1 shows an illustrative drilling environment.

It should be understood, however, that the specific embodiments given in the drawings and detailed description do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are methods and systems for determining characteristics of a flow of a mixture of drilling fluid and cuttings in an annulus of a wellbore. According to at least some embodiments, a method of determining such characteristics includes estimating a pattern of the flow as a stationary bed flow, a dispersed flow, or a transitional flow that is relative to the stationary bed flow and the dispersed flow, and estimating a plurality of parameters based on the estimated pattern of the flow. The method further includes determining a plurality of dimensionless parameters, based on the estimated plurality of parameters. The dimensionless parameters include a first dimensionless parameter corresponding to an effect of turbulence on the flow and a second dimensionless parameter corresponding to an effect of gravity on the flow. The method further includes characterizing the pattern of the flow as the stationary bed flow, the dispersed flow, or the transitional flow, based on the determined dimensionless parameters, and modeling the flow based on the estimated pattern if it is determined that the characterized pattern matches the estimated pattern.

A related computing system includes a processor that estimates a pattern of the flow as a stationary bed flow, a dispersed flow, or a transitional flow that is relative to the stationary bed flow and the dispersed flow. The processor estimates a plurality of parameters based on the estimated pattern of the flow. The processor determines a plurality of dimensionless parameters, based on the estimated plurality of parameters. The dimensionless parameters include a first dimensionless parameter corresponding to an effect of turbulence on the flow and a second dimensionless parameter corresponding to an effect of gravity on the flow. The processor characterizes the pattern of the flow as the stationary bed flow, the dispersed flow, or the transitional flow, based on the determined dimensionless parameters. The processor models the flow based on the estimated pattern if it is determined that the characterized pattern matches the estimated pattern.

Because a sufficiently high cuttings concentration and/or a sufficiently high degree of cuttings deposition in a flow conduit (e.g., an annulus) could lead to a significant loss in pressure and/or a blockage in the conduit, predictions and estimates of a flow pattern, a pressure gradient, and/or a concentration of cuttings in the conduit often are estimated during design and/or operation of a drilling system.

An illustrative drilling environment is shown in FIG. 1. A drilling platform 102 is equipped with a derrick 104 that supports a hoist 106 for raising and lowering a drill string 108. The hoist 106 suspends a top drive 110 that is used to rotate the drill string 108 and to lower the drill string through the well head 112. Sections of the drill string 108 are connected by threaded connectors 107. Connected to the lower end of the drill string 108 is a drill bit 114. Rotation of the drill bit 114 creates a borehole 120 that passes through various formations 121. A pump 116 circulates drilling fluid through a supply pipe 118 to the top drive 110, downhole through the interior of the drill string 108, through orifices in the drill bit 114, back to the surface via an annulus 150 around the drill string, and into a retention pit 124. The drilling fluid transports cuttings from the borehole 120 into the retention pit 124 and aids in maintaining the integrity of the borehole.

A computer system (or processing system) 140 is coupled to control the pump 116 and includes computing facilities for determining or simulating characteristics of a flow of a mixture of drilling fluid and cuttings in the annulus 150. In at least some embodiments, the computer system 140 includes a processor 142 that performs wellbore analysis operations by executing software or instructions obtained from a local or remote non-transitory computer-readable medium 148. The processor 142 may be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In at least some embodiments, computer hardware can further include elements such as, for example, a memory (e.g., random access memory (RAM), flash memory, read only memory (ROM), programmable read only memory (PROM), erasable read only memory (EPROM)), registers, hard disks, removable disks, CD-ROMS, DVDs, or any other like suitable storage device or medium. The computer system 140 also may include input device(s) 146 (e.g., a keyboard, mouse, touchpad, etc.) and output device(s) 144 (e.g., a monitor, printer, etc.). Such input device(s) 146 and/or output device(s) 144 provide a user interface that enables an operator to interact with the pump 116 and/or software executed by the processor 142.

FIGS. 2(a), 2(b), 2(c) and 2(d) illustrate examples of flow patterns of a two-phase flow. In a two-phase flow, one phase is a liquid (e.g., drilling fluid), and another phase may be a solid (e.g., cuttings formed by the drill bit 114). The pattern of such a flow may be classified as one of various patterns. For example, the pattern may be classified as a stationary bed flow or a dispersed flow. As another example, the pattern may be classified as a transitional flow with respect to (e.g., in between) the stationary bed and dispersed flows.

Figure 2A:
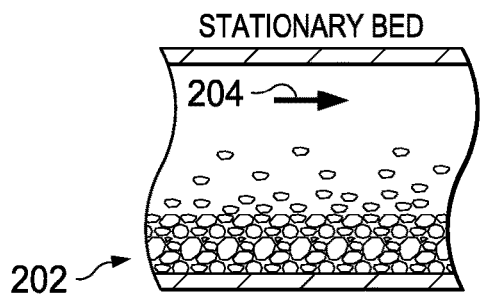
FIGS. 2(a), 2(b), 2(c) and 2(d) illustrate examples of flow patterns of a two-phase flow.

FIG. 2(a) illustrates an example of a stationary bed flow. In the stationary bed flow, at least a portion of the cuttings forms a bed 202 (e.g., a packed bed) at the bottom of a flow conduit (e.g., annulus 150). A flow 204 is located above the bed 202. A portion (e.g., layer) of the flow 204 may include a mixture of liquid(s) and cuttings. Alternatively (or in addition), a portion of the flow 204 may largely include liquid(s) only. The bed 202 is stationary in that the cuttings that form the bed remain in static positions as the flow 204 moves through the flow conduit.

Figure 2B:
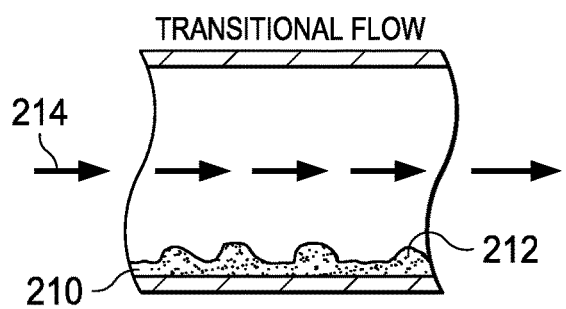
Figure 2C:
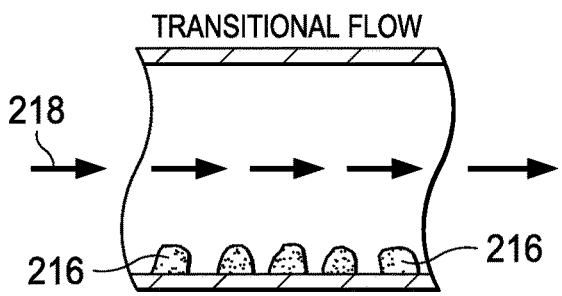
Figure 2D:
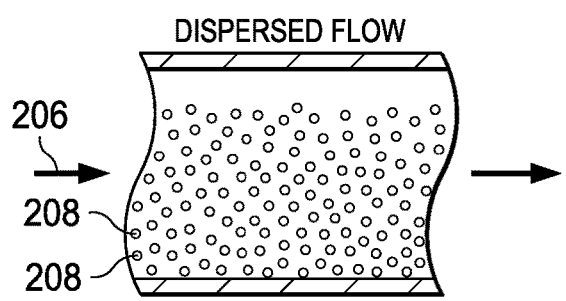

FIG. 2(d) illustrates an example of a dispersed flow 206. Unlike the flow 204 of FIG. 2(a), the dispersed flow 206 is not located above a packed bed. Rather, the pattern illustrated in FIG. 2(d) lacks a bed similar to the bed 202 of FIG. 2(a). Cuttings 208 in the conduit are fully dispersed throughout the flow 206 and, therefore, move with the flow.

FIGS. 2(b) and 2(c) illustrate examples of a transitional flow. The transitional flow is a transitional pattern that may include characteristics similar to those of a stationary bed flow (see FIG. 2(a)) as well as characteristics similar to those of a dispersed flow (see FIG. 2(d)). For example, with reference to FIG. 2(b), at least a portion of the cuttings forms a bed 210 and one or more dunes 212 located at the bottom of the flow conduit. Cuttings that form the bed 210 and the dunes 212 are not stationary and may move along the direction of a flow 214.

As another example, with reference to FIG. 2(c), at least a portion of the cuttings forms one or more dunes 216 located at the bottom of the flow conduit. Particles that form the dunes 216 are not stationary and may move along the direction of a flow 218.

In order to predict the pattern(s) of a particular flow, a series of experimental tests may be conducted. Based on such tests, the flow patterns may be plotted or mapped, e.g., by using parameters such as superficial particle velocity and fluid velocity. However, based on such an approach, the breadth of the resulting plots or maps may be somewhat limited. For example, the maps may be valid in situations involving conditions under which the experimental tests were conducted, but not in other situations. For example, the experimental tests may have been conducted assuming monodisperse particles of a specific size. In this regard, the resulting maps may be valid in situations where such particles are present, but not in other situations. For different operations, the size of transported particles may vary significantly (e.g., from tens of microns to several centimeters). Performing experimental tests in order to cover such a range of sizes might not be practical.

Particle size is but one example of a parameter that affects the pattern of a particular flow. Other examples of such parameters include particle shape, bulk density, particle volume fraction in the flow, flow conduit shape and size, flow conduit inclination angle, fluid velocity, and fluid viscosity and density. Similar to particle size, some of these additional parameters are based on a particular dimension (or a fundamental unit, e.g., of mass, length, or time). Performing experimental tests in order to cover a suitable range for one or more of these parameters might not be practical.

As noted earlier, estimates of a pressure gradient and a concentration of cuttings may also be predicted or estimated. In particular, the presence of cuttings in an annulus may have a significant effect on a pressure profile of a wellbore. As such, conditions related to hole cleaning (e.g., cuttings concentration) and pressure loss in the wellbore may be closely related. Estimates of a pressure gradient and a concentration of particles may be based upon a pattern(s) that is estimated for a particular flow. Therefore, an improved approach to the estimation of the pattern(s) of a particular flow may likewise improve the estimation of parameters such as pressure gradient and cuttings concentration.

Hole cleaning is often important in drilling operations because inadequate hole cleaning can lead to stuck pipe, fractured formation, high rotary torque, premature bit wear, decreased rate of penetration (ROP), and/or logging, casing, and cementing problems. According to one study, a significant amount (around 70%) of time that is lost due to unexpected events is associated with stuck pipe. Also, a third of situations involving stuck pipe were due to inadequate hole cleaning.

According to aspects of this disclosure, considerations relating to hole cleaning and considerations relating to the pressure profile in a wellbore are considered jointly, rather than separately. For example, according to various embodiments, a flow pattern map is used in conjunction with analysis based on one or more mechanistic models, in order to model a hole cleaning process and a wellbore pressure profile more accurately. Such an approach may be used to model processes under various conditions, such as different wellbore inclination angles, different wellbore geometries, and different drilling fluids.

According to various embodiments disclosed herein, dimensionless parameters are used to classify a flow (e.g., a two-phase flow in an annulus). For example, values of the dimensionless parameters are used to classify a particular flow as either a stationary bed flow (see, e.g., FIG. 2(a)), a dispersed flow (see, e.g., FIG. 2(d)) or a transitional flow (see, e.g., FIGS. 2(b), 2(c)). According to particular embodiments, the classification is based on a dimensionless flow pattern map. Further, analysis based on one or more mechanistic models is performed in order to aid hole cleaning and hydraulic monitoring processes. Features disclosed herein may be used to provide practical suggestions in association with well design, drilling optimization, selection of drilling operational parameters, and drilling automation.

The dimensionless parameters may serve as a measure of various factors that affect solid phase transport. According to particular embodiments, the classification is performed based on a flow pattern map. The flow pattern map has axes that respectively correspond to a first dimensionless parameter and a second dimensionless parameter. As such, the breadth of the map is more generalized, in that the map is valid for a variety of different particles (e.g., cuttings), different conduits, and/or different fluids.

In addition, the dimensionless parameters are also used to estimate parameters such as a pressure gradient and a cuttings concentration (or cuttings volume fraction).

According to at least one embodiment, a first dimensionless parameter $\Omega_h$ is determined based on the following equation:

$$\Omega_h = \frac{u^*}{u_{settling} \cdot \sin\theta}. \quad (1)$$

Figure 3:
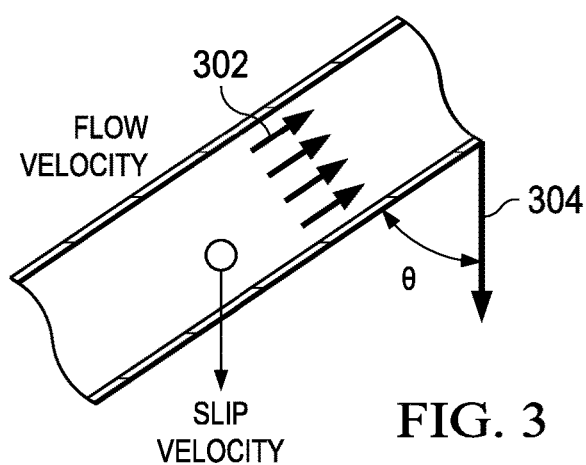
FIG. 3 illustrates an example of an orientation of a flow direction with respect to a direction of gravity.

In the above Equation (1), u* denotes a friction velocity (or sheer velocity) of the flow of the fluid (e.g., drilling fluid), $u_{settling}$ denotes a settling velocity (or terminal velocity) of particles (e.g., cuttings) in the fluid, and θ denotes an inclination angle of a conduit (e.g., annulus 150 in borehole 120) deviated from vertical. FIG. 3 illustrates an example of an orientation of a flow direction with respect to a direction of gravity. With reference to FIG. 3, a direction 302 corresponds to a direction of flow, and a direction 304 corresponds to a downward direction of gravity.

θ denotes an angle between the direction 302 and the direction 304. θ may range from 0 to 180 degrees. For example, a value of 0 degrees indicates that the flow is in a fully upward direction (e.g., fully opposite the force of gravity). A value between 0 and 90 degrees indicates that the flow is in a partially upward direction. A value between 90 and 180 degrees indicates that the flow is in a partially downward direction, and a value of 180 degrees indicates that the flow is in a fully downward direction (e.g., fully with the force of gravity).

The friction velocity u* is determined based on the following equation:

$$u^* = \sqrt{\frac{\tau}{\rho_f}}. \quad (2)$$

In the above Equation (2), τ denotes the shear stress in an arbitrary layer of fluid (which is related to the pressure gradient) and $\rho_f$ denotes the fluid density.

According to at least one embodiment, a second dimensionless parameter $\Omega_v$ is determined based on the following equation:

$$\Omega_v = \frac{u_f}{u_{settling} \cdot \sin\theta}. \quad (3)$$

In the above Equation (3), $u_f$ denotes the average carrier fluid velocity, which is the fluid volume flow rate divided by the open area of the conduit.

For a particular flow, values of the dimensionless parameters $\Omega_h$ and $\Omega_v$ are used to classify a particular flow as being one of various patterns. For example, the flow may be classified as either a stationary bed flow, a dispersed flow, or a transitional flow. The classification may be based on a flow pattern map. An example of a flow pattern map is illustrated in FIG. 4.

In the map 400, the horizontal axis (x-axis) represents values of the dimensionless parameter $\Omega_h$, and the vertical axis (y-axis) represents values of the dimensionless parameter $\Omega_v$. Depending on the position of a particular (x, y) pair in the map 400, a corresponding flow is classified as either a stationary bed flow, a dispersed flow, or a transitional flow.

Figure 4:
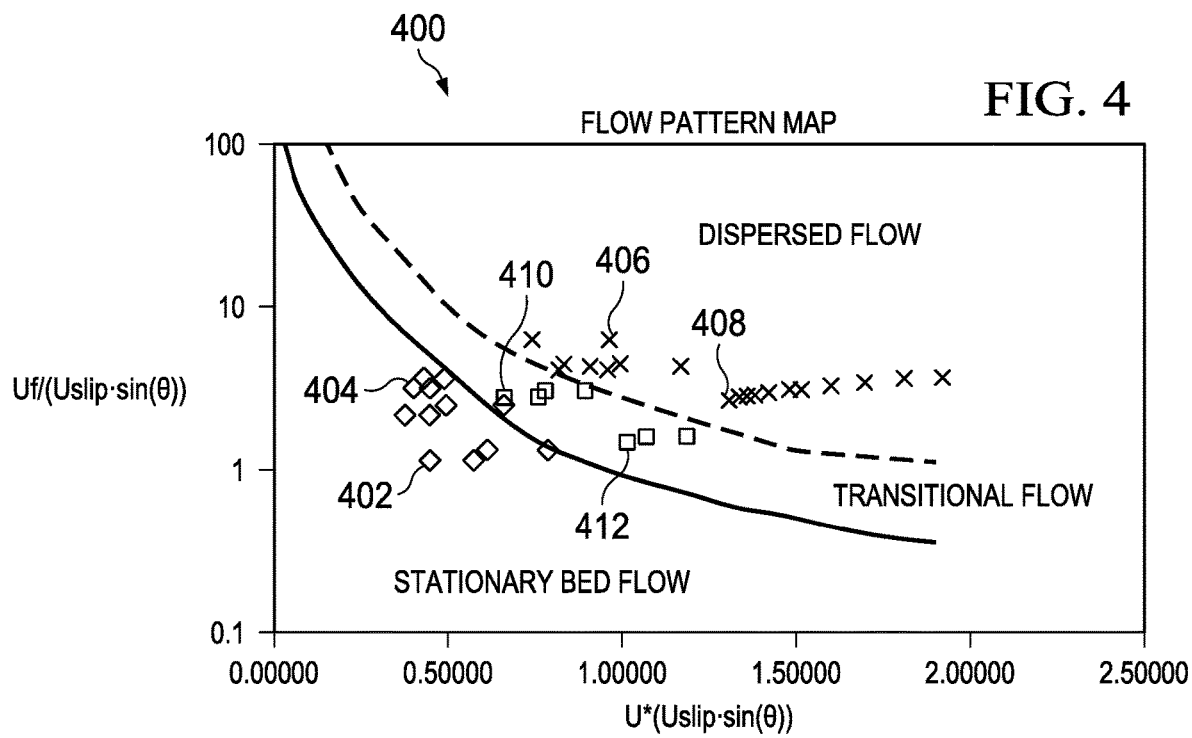
FIG. 4 illustrates an example of a flow pattern map.

For example, with continued reference to FIG. 4, pair 402 would be classified as a stationary bed flow. Similarly, pair 404 would be classified as a stationary bed flow. Pair 406 would be classified as a dispersed flow. Similarly, pair 408 would be classified as a dispersed flow. Pair 410 would be classified as a transitional flow. Similarly, pair 412 would be classified as a transitional flow.

The classification illustrated in FIG. 4 is based on parameters that are dimensionless. For example, neither of the parameters $\Omega_h$ and $\Omega_v$ is measured by or based on a fundamental unit, e.g., of mass, length, or time. Accordingly, the classification is not constrained by experimental test factors, such as the size of cuttings particles.

The values of the dimensionless parameters that are disclosed herein describe various physical effects influencing the solid phase transport. For example, the dimensionless parameter $\Omega_h$ characterizes an effect (or importance) of flow turbulence, resuspending the particles (e.g., cuttings). High values of this parameter may indicate that most of the cuttings may be expected to be well mixed with the carrier fluid.

The dimensionless parameter $\Omega_v$ characterizes the effect of gravity on the flow. Low values of this parameter may indicate that most of the cuttings may be expected to be settled at the bottom of the conduit.

As expressed in Equations (1) and (3), both $\Omega_h$ and $\Omega_v$ are determined based, at least in part, on the settling velocity $u_{settling}$ and the angle θ. The multiplicative product of the settling velocity $u_{settling}$ and sin θ is a component of the settling velocity in the direction perpendicular to the conduit axis.

The settling velocity $u_{settling}$ reflects various properties of cuttings particles (e.g., size, shape, and density). Various fluid properties (e.g., density and viscosity) are reflected in both the settling velocity $u_{settling}$ and the friction velocity u*. The cuttings concentration and the conduit geometry may also be reflected in the friction velocity. The conduit inclination angle is accounted by including sin θ in the determination of $\Omega_v$.

Figure 5:
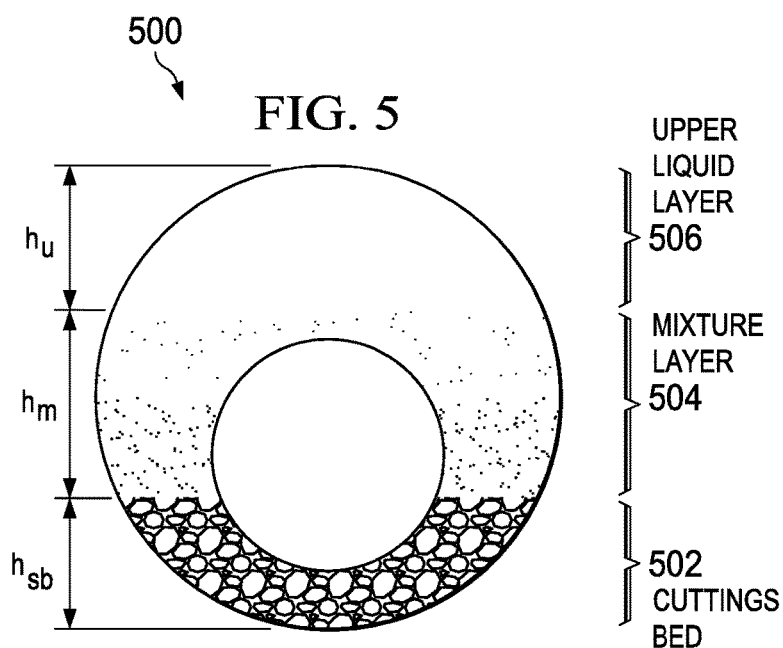
FIG. 5 illustrates a model of a flow in a cross-section of an annulus.

FIG. 5 illustrates a model 500 of a flow in a cross-section of an annulus. The model 500 illustrates a flow that may be a stationary bed flow (see, e.g., FIG. 2(a)) or a transitional flow (see, e.g., FIG. 2(c)). Different sections of the flow are modeled as different layers in the model 500. For example, the model 500 illustrates that the flow includes a cuttings bed layer 502, a mixture layer 504, and an upper liquid layer 506.

The cuttings bed layer 502 is primarily formed of cuttings. The cuttings may be part of a bed (a moving bed or a stationary bed) or may be part of one or more dunes. The height of the cuttings bed layer 502 is illustrated as $h_{sb}$. The mixture layer 504 includes a mixture of drilling liquid and cuttings that move with the flow of the drilling liquid. The height of the mixture layer 504 is illustrated as $h_m$. The upper liquid layer 506 is primarily formed of drilling liquid. The height of the upper liquid layer 506 is illustrated as $h_u$.

As noted earlier, each flow may be classified as a stationary bed flow, a transitional flow, and/or a dispersed flow. According to embodiments disclosed herein, for each of these flow patterns, mechanistic models are developed to calculate the pressure gradient and cuttings concentration in the wellbore. These mechanistic models are based on configurations of the flow patterns, mass balance, and momentum balance.

With respect to flows that are classified as stationary bed flows and/or transitional flows, layer models have been described in Wilson, Slip Point of Beds in Solids-liquid Pipeline Flow, Proc. ASME, J. Hyd. Div., 96, 1-12, 1990, and in Doron et al., Flow of Solid-Liquid Mixture in Inclined Pipes. Int. J. Multiphase Flow Vol. 23, No. 2, pp. 313-323, 1997. These layer models effectively describe a balance of mass and momentum in each section (e.g., packed particles, particle-liquid mixture, liquid) in the flow.

The mass conservation for solid phase is based on the following equation:

$$\rho_s A_b \emptyset U_b + \rho_s A_m C_m U_{ms} = \rho_s A U_{ss}. \quad (4)$$

In the above Equation (4): $\rho_s$ denotes the solid density, $A_b$ denotes the packed bed cross-section area, $\emptyset$ denotes the packed solids porosity, $U_b$ denotes the packed bed velocity, $A_m$ denotes the mixture layer cross-section area, $C_m$ denotes the average solids fraction in the mixture layer, $U_{ms}$ denotes the average mixture layer solid velocity, A is the total cross-section area, and $U_{ss}$ is the superficial solid velocity. In the case of a stationary bed, the value of the packed bed velocity $U_b$ is 0. Therefore, when a flow is classified as (or assumed to be) a stationary bed flow, the expression $\rho_s A_b \emptyset U_b$ may be neglected. In contrast, when a flow is classified as a transitional flow, the expression $\rho_s A_b \emptyset U_b$ should not necessarily be neglected.

The mass conservation for liquid phase is based on the following equation:

$$\rho_f A_u U_u + \rho_f A_m (1-C_m) U_{mf} + \rho_f A_{sb} (1-\emptyset)(U_b + U_r) = \rho_f Q. \quad (5)$$

In the above Equation (5): $\rho_f$ denotes the fluid density, $A_u$ denotes the upper layer cross-section area, $U_u$ is the upper liquid layer velocity, $U_{mf}$ denotes the average mixture layer fluid velocity, $A_{sb}$ denotes the solid bed cross-sectional area, $U_r$ denotes the fluid velocity in the porous media, and Q denotes the fluid flow rate.

The momentum conservation for the upper liquid layer (e.g., upper liquid layer 506), mixture layer (e.g., mixture layer 504) and cuttings bed layer (e.g., cuttings bed layer 502) are based on the below equations (6), (7) and (8), respectively:

Upper liquid layer: $-A_u \left(\frac{\Delta P}{L}\right)_u = -\tau_u S_u - \tau_{u\_m} S_{u\_m} - \rho_u g A_u \cos\theta \quad (6)$ Mixture layer: $-A_m \left(\frac{\Delta P}{L}\right)_m = \quad (7)$
$-\tau_m S_m + \tau_{u\_m} S_{u\_m} + \tau_{m\_sb} S_{m\_sb} - \rho_m g A_m \cos\theta$ Cuttings bed layer: $-A_b \left(\frac{\Delta P}{L}\right)_b = -\tau_b S_{sb} + \tau_{m\_sb} S_{m\_sb} - \rho_b g A_b \cos\theta \quad (8)$ In the above Equation (6), $$\left(\frac{\Delta P}{L}\right)_u$$

denotes a pressure gradient in the upper liquid layer, $\tau_u$ denotes the friction stress between the upper layer and the wall, $S_u$ denotes the wet perimeter between upper layer and wall, $\tau_{u\_m}$ denotes the friction stress between the upper layer and the mixture layer, $S_{u\_m}$ denotes the wet perimeter between the upper layer and the mixture layer, $\rho_u$ denotes the average density of the upper liquid layer, g denotes the acceleration due to gravity, and $\theta$ denotes an inclination angle of the wellbore deviated from vertical.

Further, with respect to Equation (7), $$\left(\frac{\Delta P}{L}\right)_m$$

denotes a pressure gradient in the mixture layer, $\tau_m$ denotes the friction stress between middle layer and the wall, $S_m$ denotes the wet perimeter between the mixture layer and the wall, $\tau_{m\_sb}$ denotes the friction stress between the mixture layer and the cuttings bed layer (stationary bed), $S_{m\_sb}$ denotes the wet perimeter between the mixture layer and the cuttings bed layer, and $\rho_m$ denotes the average density of the mixture layer.

Further, with respect to Equation (8), $$\left(\frac{\Delta P}{L}\right)_b$$

denotes a pressure gradient in the cuttings bed layer, $\tau_b$ denotes the friction stress between the cuttings bed layer and the wall, $S_{sb}$ denotes the wet perimeter between the cuttings bed layer and the wall, and $\rho_b$ denotes the density of the solid bed layer.

According to various embodiments, a flow is modeled based on a height of the mixture layer and also based on a balance between a deposition rate and a re-suspension rate of particles. Based on this modeling, a pressure gradient and a cuttings concentration in the flow may be determined.

At the outset, it may not be known whether a particular flow should be classified as a stationary bed flow, a transitional flow, or a dispersed flow. Therefore, one or more assumptions may be made. These assumptions may be made independent of each other. Modeling of the flow is then performed separately based on each of the assumptions. The validity of each assumption is then determined, as will be explained in further detail below.

In the case of an assumed dispersed flow, the flow lacks an upper liquid layer and a stationary bed layer (see, e.g., model 500.) Rather, the entire flow can be considered entirely as a mixture layer. Determination of the cuttings concentration and the pressure gradient of a dispersed flow will be described later.

Figure 6:
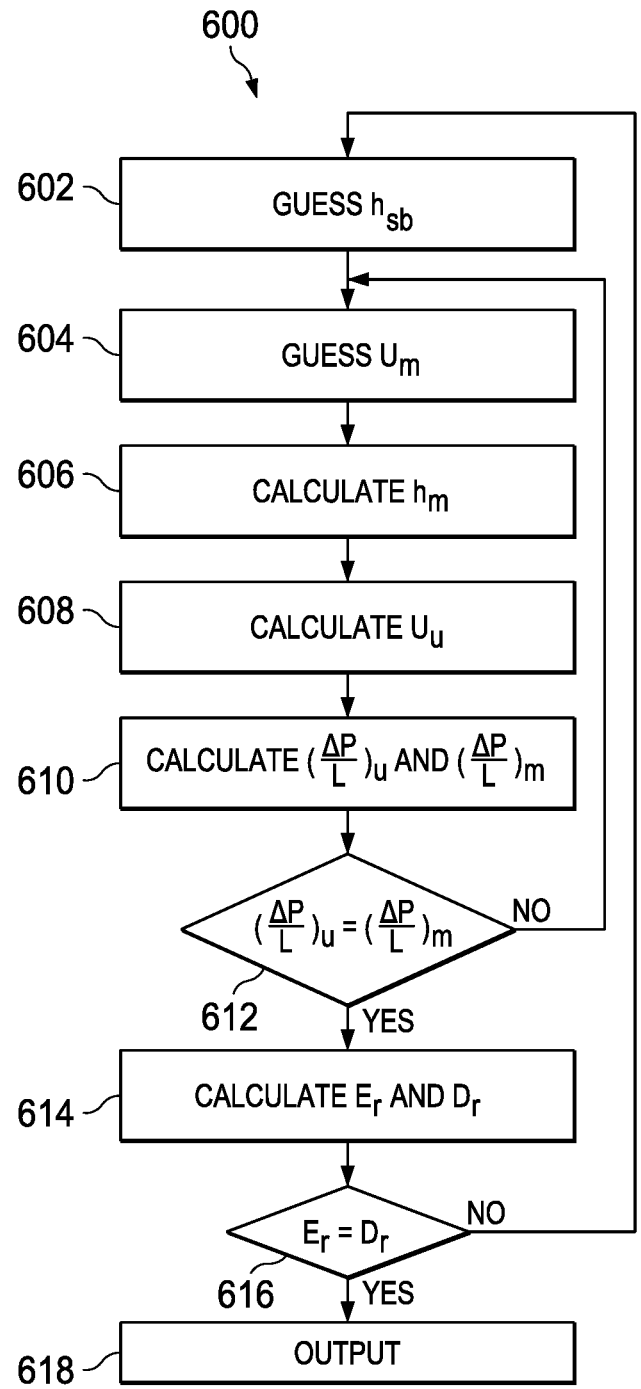
FIG. 6 illustrates an example of a flowchart for modeling a stationary bed flow or a transitional flow.

In the case of an assumed stationary bed flow or an assumed transitional flow, the flow may be performed, as illustrated in the flowchart 600 of FIG. 6.

In block 602, an estimate of the height $h_{sb}$ of the packed bed (e.g., bed 202, bed 210, cuttings bed 502) is made. Then, the cross-sectional area $A_{sb}$ of the packed bed is determined based on the conduit geometry. For example, once the height $h_{sb}$ is estimated, then the cross-sectional area $A_{sb}$ may be determined based on knowledge of the diameter of the drill string (e.g., drill string 108) and an estimate of the diameter of the borehole.

In block 604, the average velocity $U_m$ of the mixture layer (e.g., mixture layer 504) is estimated. The average velocity $U_m$ accounts for the fluid in the mixture layer as well as the solids (e.g., cuttings) in the mixture layer.

In block 606, the height $h_m$ of the mixture layer is determined. For example, the height $h_m$ may be determined through the balance between particle diffusions and settling, which is shown in the following equation. At the surface of the cuttings bed, y=0, C=0.6. Assume a small C value for the top of the mixture layer, e.g., 0.00001, the obtained y value is $h_m$. $D_p$ denotes the particle diffusion coefficient, and $v_{settling}$ denotes the particle settling velocity. The average solids fraction in the mixture layer $C_m$ can also be obtained by averaging the C for each y value.

$$D_p \frac{\partial^2 C(y,t)}{\partial y^2} = v_{settling} \frac{\partial C(y,t)}{\partial y}. \tag{9}$$

Figure 7:
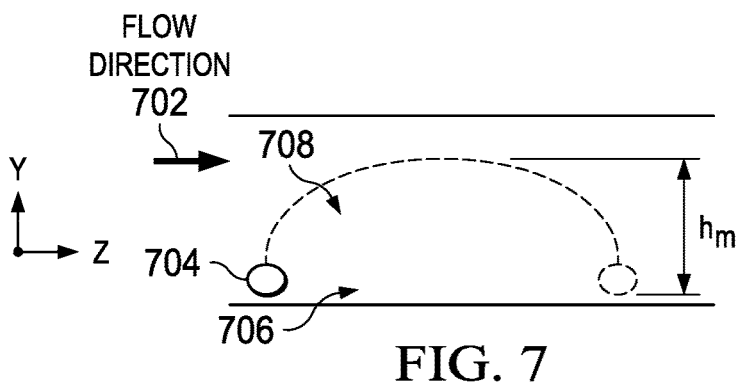
FIG. 7 illustrates a moving trajectory of a cuttings particle in a direction of flow.

An example of the height $h_m$ is illustrated in FIG. 7, which illustrates a moving trajectory of a particular cuttings particle 704 in a direction 702 of flow. The particle 704 moves from a bed 706 to a mixture layer 708 (e.g., re-suspension) and from the mixture layer back to the bed (e.g., deposition). The height $h_m$ is equal to the maximum height that the particle 704 can reach from the bed.

Based on the heights $h_{sb}$ and $h_m$, the height $h_u$ of the upper liquid layer (e.g., upper liquid layer 506) may also be estimated. Once the heights $h_m$ and $h_u$ are estimated, then the cross-sectional areas $A_m$ and $A_u$ of the mixture layer and the upper liquid layer, respectively, may be determined based on the conduit geometry. For example, the cross-sectional areas $A_m$ and $A_u$ may be determined based on knowledge of the diameter of the drill string and/or an estimate of the diameter of the borehole.

In block 608, the velocity $U_u$ of the upper liquid layer is determined. For example, the velocity $U_u$ may be based by considering the mass conservation for the liquid phase (see, e.g., Equation (5)).

In block 610, momentum conservation for the upper liquid layer and momentum conservation for the mixture layer are considered. For example, based on Equations (6) and (7), respectively, the pressure gradient $$\left(\frac{\Delta P}{L}\right)_u$$

of the upper layer and Inc pressure gradient $$\left(\frac{\Delta P}{L}\right)_m$$

of the mixture layer are determined.

In block 612, it is determined whether the values of $$\left(\frac{\Delta P}{L}\right)_u \text{ and } \left(\frac{\Delta P}{L}\right)_m$$

converge. For example, it is determined whether abs $$\left(\left(\frac{\Delta P}{L}\right)_u - \left(\frac{\Delta P}{L}\right)_m\right)$$

is greater man a particular tolerance level. If abs $$\left(\left(\frac{\Delta P}{L}\right)_u - \left(\frac{\Delta P}{L}\right)_m\right)$$

is greater than the particular tolerance level, then it may be determined that the values do not converge. This indicates that an estimated value (e.g., $U_m$ of block 604) is not correct (e.g., sufficiently accurate).

With continued reference to FIG. 6, if the values do not converge, then the modeling returns to block 604, where the value of the average velocity $U_m$ of the mixture layer is estimated again. The re-estimate of $U_m$ is then followed by a re-determination of the height $h_m$ of the mixture layer (see, e.g., block 606), and so forth.

If it is determined that the values of $$\left(\frac{\Delta P}{L}\right)_u \text{ and } \left(\frac{\Delta P}{L}\right)_m$$

converge, then this indicates that the estimated value of $U_m$ is correct (e.g., sufficiently accurate). In block 614, a deposition rate $D_r$ and a re-suspension rate $RE_r$ are determined.

Figure 8:
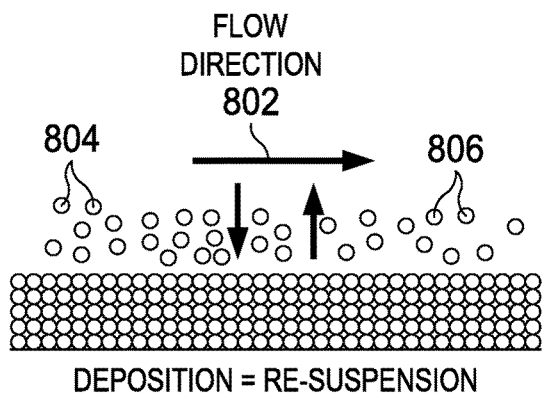
FIG. 8 depicts an illustrative flow scenario.

FIG. 8 depicts an illustrative flow scenario. A flow moves along a direction 802. Over a certain period of time, cuttings particles 804 become deposited according to a deposition rate $D_r$. In this regard, the cuttings particles 804 are deposited in the annulus such that the cuttings particles become part of a stationary bed (e.g., stationary bed 202), a moving bed (e.g., bed 210), and/or a moving dune (e.g., dune 212, 216). Also over this period of time, cuttings particles 806 may be re-suspended in the annulus. For example, particles that formed part of a bed or a moving dune are re-suspended in the fluid so that they flow with the fluid along the direction 802.

The deposition rate $D_r$ is determined based on the following equation:

$$D_r = m_{dep} u_{settling} \sin \theta. \tag{10}$$

In the above Equation (10), $m_{dep}$ denotes the deposition factor, which is a dimensionless number controlling the particle deposition rate. As noted earlier with reference to Equations (1) and (3), $u_{settling}$ denotes the settling velocity, and $\theta$ denotes the inclination angle of the conduit (e.g., wellbore) deviated from vertical.

The re-suspension rate $RE_r$ is determined based on the following equations:

$$RE_r = \begin{pmatrix} m_{ent}(u^* - U_t^*) & u^* > U_t^* \\ 0 & u^* < U_t^* \end{pmatrix} \tag{11}$$

In Equations (11), $m_{ent}$ denotes the entrainment coefficient, which is a dimensionless number controlling the particle deposition rate. As noted earlier with reference to Equations (1) and (2), $u^*$ denotes the friction velocity. $U_t^*$ denotes the threshold friction velocity required to lift a solid particle, which depends on fluid properties and particle properties. Further details regarding the threshold friction velocity $U_t^*$ can be found in Li et al., "Overview Particles Transport Study and Application in Oil-Gas Industry-Theoretical Work", IPTC 17832, International Petroleum Technology Conference, 10-12 Dec. 2014, Kuala Lumpur, Malaysia.

If the value of the friction velocity u* is smaller than the threshold friction velocity, then the friction velocity is not sufficiently high to lift (or dislodge) a particle from a bed or a dune. In this situation, no particles are re-suspended, and the re-suspension rate is determined to be zero. However, if the value of the friction velocity u* is larger than the threshold friction velocity, then the friction velocity is sufficiently high to lift (or dislodge) a particle. In this situation, at least some particles are re-suspended, and the re-suspension rate is determined to be proportional to a difference between the friction velocity and the threshold friction velocity.

In block 616, it is determined whether the re-suspension rate $RE_r$ and the deposition rate $D_r$ are balanced. For example, if it is determined that abs($RE_r-D_r$) is greater than a particular tolerance level, then it may be determined that the rates are not balanced. In this situation, the modeling returns to block 602, where the height $h_{sb}$ of the packed bed is estimated again. The re-estimate of the height $h_{sb}$ then leads to another estimate of the average velocity $U_m$ of the mixture layer (see block 604), and so forth.

If it is determined that the re-suspension rate $RE_r$ and the deposition rate $D_r$ are balanced, then, at block 618, the parameters that have been estimated/determined are used to determine the values of the dimensionless parameters (e.g., $\Omega_h$ and $\Omega_v$).

If a stationary bed flow or a transitional flow was assumed, the cuttings concentration and pressure gradient can be obtained by using the mechanistic models as that described by Zhang et al., "Pressure Profile in Annulus: Particles Play a Significant Role", Journal of Energy Resources Technology, November 2015; 137(6).

If a dispersed flow was assumed, the cuttings concentration C may be determined based on the following equation:

$$C = -\frac{U_m - U_{slip}}{2 \cdot U_{slip}} + \left(\left(\frac{U_m - U_{slip}}{2 \cdot U_{slip}}\right)^2 + \frac{U_{ss}}{U_{slip}}\right)^{0.5}. \quad (12)$$

In the above Equation (12), $U_m$ denotes the solid and liquid mixture velocity, $U_{slip}$ denotes the slip velocity of the cuttings particles, and $U_{ss}$ denotes the superficial solid velocity. The pressure gradient is calculated by assuming the dispersed flow is homogeneous and by adding the friction loss and gravity together. The approach involving these two terms is the same as the traditional approach to calculate the pressure loss of a single phase flow, except that the single phase density is replaced with the mixture density.

As described, a flow having an assumed flow pattern (e.g., stationary bed flow, transitional flow, or dispersed flow) has a respective set of outputs. The set of outputs may be used to determine values of dimensionless parameters (e.g., $\Omega_h$ and $\Omega_v$). The dimensionless parameters may then be applied to a flow pattern map (e.g., flow pattern map 400) to determine a corresponding flow pattern. The determined flow pattern is then matched against the assumed flow pattern. If the determined flow pattern matches the assumed flow pattern, then the flow is modeled based on the assumed flow pattern. If the determined flow pattern does not match the assumed flow pattern, then the assumed flow pattern is not used to model to flow pattern.

For example, a flow may be assumed to be a stationary bed flow. Based on this assumption, a set of outputs is generated. The outputs are used to determine values of dimensionless parameters (e.g., $\Omega_h$ and $\Omega_v$). The dimensionless parameters are then applied to a flow pattern map (e.g., flow pattern map 400) to determine a corresponding flow pattern. If the determined flow pattern is that of a stationary bed flow, then the flow is modeled based on the flow being a stationary bed flow. If the determined flow pattern is that of a transitional flow or a dispersed flow, then the flow is not modeled based on the flow being a stationary bed flow.

If more than one assumption is made and more than one match (e.g., between assumed flow pattern and determined flow pattern) results, then physical boundaries for solids transport may be applied to identify a single match (e.g., remove the multiple converged values to one converged value). Examples of physical boundaries may include: (1) there is no stationary bed if the conduit inclination angle is less than the solids critical sliding angle (e.g., 53 degrees); and/or (2) there are no packed solids if the conduit inclination angle is less than the solids critical deposition angle (e.g., 30 degrees).

The described modeling may be performed with respect to a flow in an annulus at various locations (e.g., vertical or measured depths) along the drilling axis of a wellbore. Accordingly, parameters including the cuttings concentration may be simulated/determined at each of the locations. In this manner, measures can be taken to keep the cuttings concentrations at one or more locations of the wellbore below a particular value (e.g., a maximum tolerance value).

Figure 9:
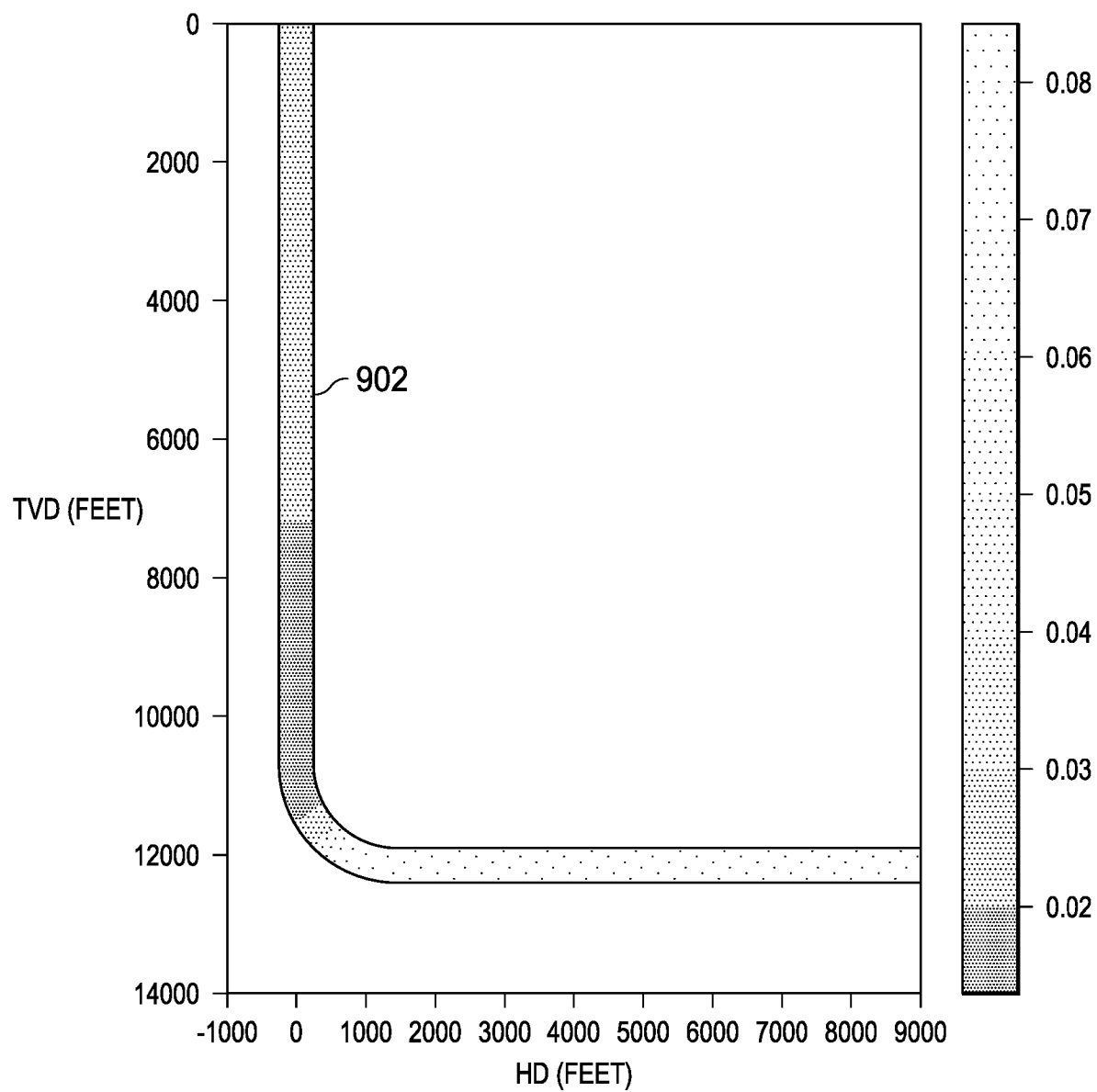
FIG. 9 illustrates estimated cuttings concentrations with respect to various locations along the drilling axis of a wellbore.

For example, FIG. 9 illustrates estimated cuttings concentrations with respect to various positions along the drilling axis of a wellbore 902. The estimates assume an input flow rate of approximately 350 gallons per minute (gpm). The input flow rate is a rate at which a pump (e.g., pump 116) circulates drilling fluid into the wellbore. The estimated cuttings concentrations at different locations along the wellbore are illustrated in FIG. 9.

At total vertical depths (TVD) between 0 and approximately 10,000 feet, the direction of flow is with the direction of gravity and, accordingly, cuttings tend not to accumulate in the annulus. Therefore, the value of the cuttings concentration is relatively low (e.g., between 2 and 3 percent). As the direction of the drilling axis changes from a primarily vertical direction to a primarily horizontal direction, the tendency of cuttings to settle in the annulus increases due to the effects of gravity. At horizontal depths (HD) between approximately 2000 and approximately 9000 feet, the direction of flow is substantially perpendicular to the direction of gravity and, accordingly, the value of the cuttings concentration is relatively high (e.g., around 8 percent).

During drilling, a certain amount of the cuttings in the annulus (e.g., as a packed bed) is acceptable. However, before tripping out the drill string or before running casing, packed cuttings should be cleaned out. In order to clean out the cuttings efficiently, it may be desirable to achieve particular types of flows in the wellbore. For example, in the case of a wellbore (or a portion thereof) that has a greater level of inclination (e.g., when the inclination angle θ (see FIG. 3) is between around 90 and 120 degrees), the flow should be a transitional flow. In the case of a wellbore (or a portion thereof) that has a lesser level of inclination, the flow should be a dispersed flow.

Features disclosed herein may be used to determine an optimal flow rate during drilling operations. For example, in many situations, the difference between equivalent circulating density (ECD) and static mud density should be kept as low as possible. The ECD is the effective density that combines current mud density and annular pressure drop.

Figure 10:
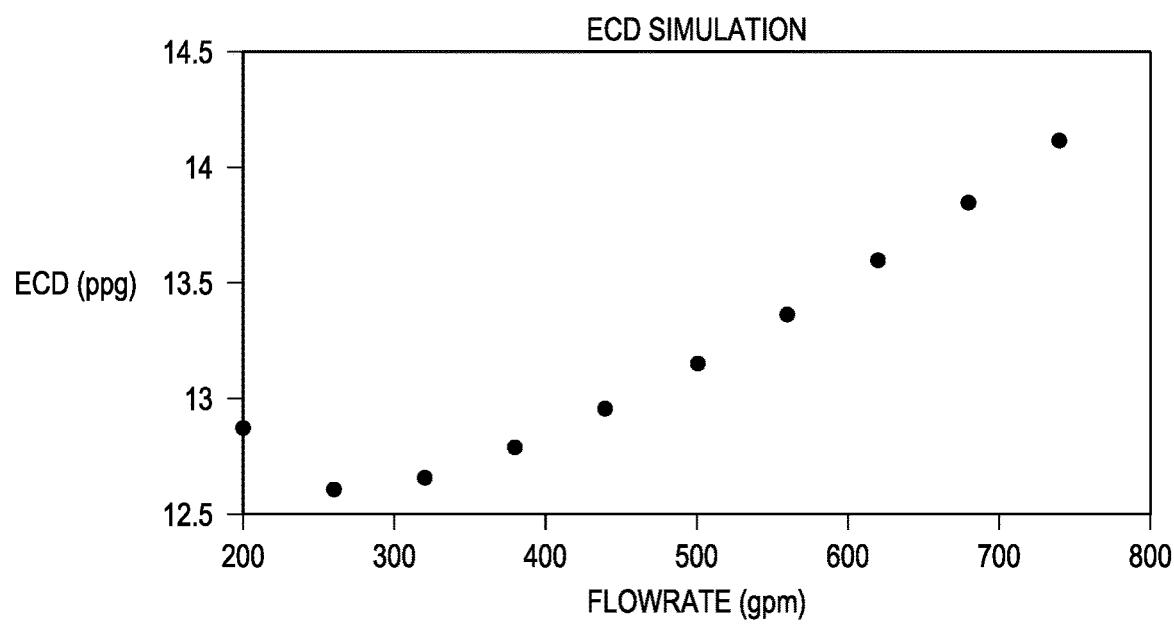
FIG. 10 illustrates a graphical relationship between flow rate and ECD.

The pressure loss in the wellbore is a combination of cuttings effects and friction effects. At low flow rates, the cuttings concentrations are high, which can lead to high pressure loss. At high flow rates, the friction loss is high, which also leads to high pressure loss in the wellbore. FIG. 10 illustrates a graphical relationship between flow rate and ECD. As illustrated in FIG. 10, the relationship between flow rate and ECD may not be necessarily linear. The minimum value of the ECD is around 12.6 pounds per gallon (ppg). The flow rate that achieves this minimum value is around 300 gpm.

Figure 11:
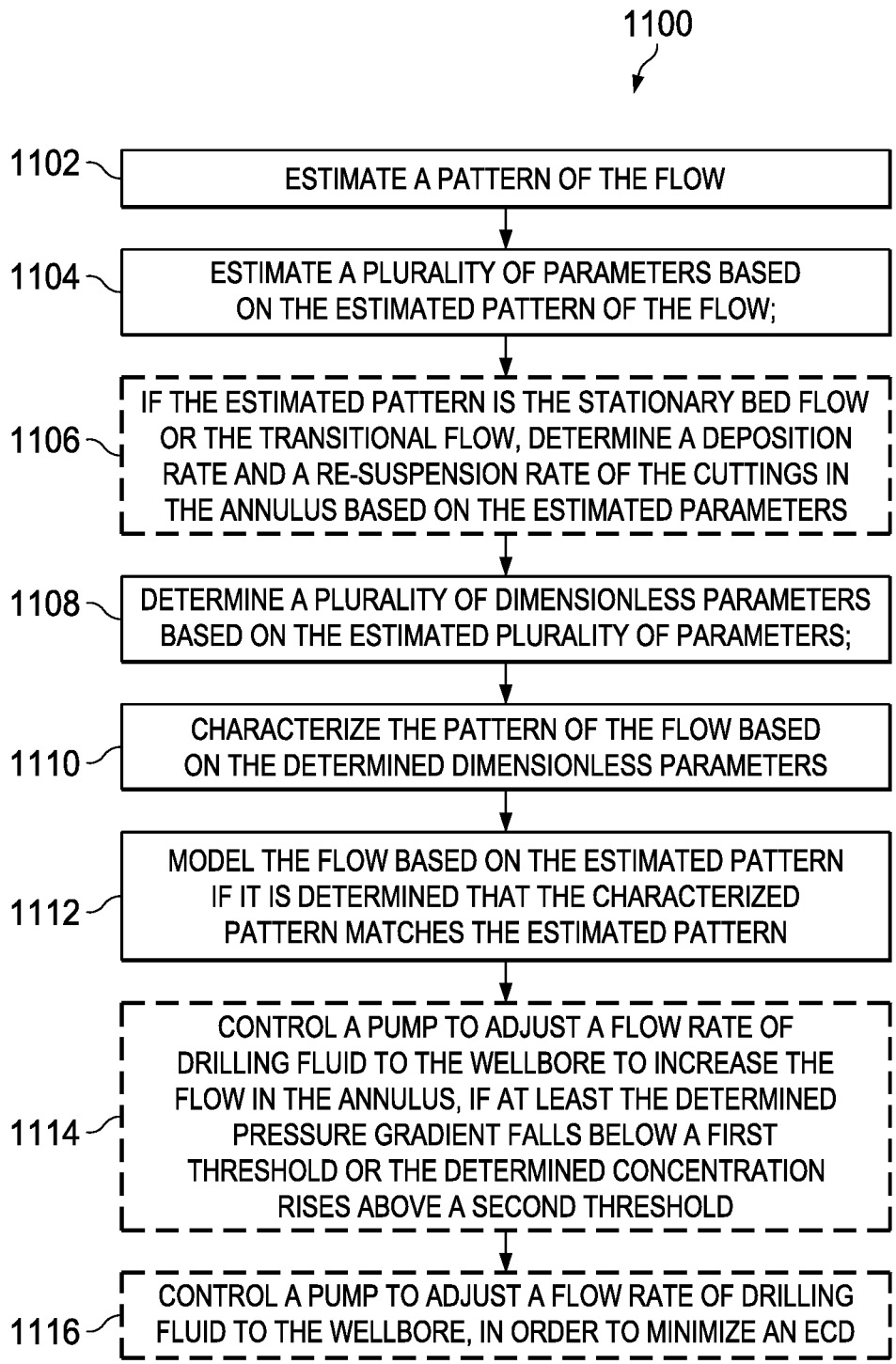
FIG. 11 is a flowchart showing a determination method.

FIG. 11 illustrates a flowchart of an illustrative method 1100 for determining characteristics of a flow of a mixture of drilling fluid and cuttings in an annulus of a wellbore.

At block 1102, a pattern of the flow is estimated. For example, the flow is estimated as a stationary bed flow (see, e.g., FIG. 2(a)), a dispersed flow (see, e.g., FIG. 2(d)), or a transitional flow (see, e.g., FIG. 2(b), FIG. 2(c)) that is relative to the stationary bed flow and the dispersed flow.

At block 1104, a plurality of parameters are estimated based on the estimated pattern of the flow (see, e.g., FIG. 6, blocks 602, 604, 606, 608, 610). For example, if the estimated pattern is the stationary bed flow or the transitional flow, then a height of a first layer of the flow may be estimated. According to a particular embodiment, the first layer is a mixture layer (e.g., mixture layer 504) that includes both drilling fluid and cuttings. Further, a pressure gradient of the first layer of the flow may also be estimated. As a further example, if the estimated pattern is the stationary bed flow or the transitional flow, then a pressure gradient of a second layer of the flow may be estimated. According to a particular embodiment, the second layer is an upper liquid layer (e.g., upper liquid layer 506) that includes drilling fluid and is free of the cuttings. Whether the pressure gradient of the first layer and the pressure gradient of the second layer are balanced is determined (see, e.g., FIG. 6, block 612).

At block 1106, if the estimated pattern is the stationary bed flow or the transitional flow, a deposition rate and a re-suspension rate of the cuttings in the annulus may be determined, based on the estimated plurality of parameters. For example, the deposition rate and the re-suspension rate are determined based on the estimated plurality of parameters if it is determined that the pressure gradient of the first layer and the pressure gradient of the second layer are balanced.

At block 1108, a plurality of dimensionless parameters are determined, based on the estimated plurality of parameters. The dimensionless parameters include a first dimensionless parameter (e.g., $\Omega_h$) corresponding to an effect of turbulence on the flow and a second dimensionless parameter (e.g., $\Omega_v$) corresponding to an effect of gravity on the flow. According to a particular embodiment, the first dimensionless parameter and the second dimensionless parameter are determined based on the estimated plurality of parameters if it is determined that the deposition rate and the re-suspension rate are balanced.

At block 1110, the pattern of the flow is characterized as the stationary bed flow, the dispersed flow, or the transitional flow, based on the determined plurality of dimensionless parameters. For example, the determined values of the dimensionless parameters (e.g., $\Omega_h$ and $\Omega_v$) are used in conjunction with a flow pattern map (e.g., flow pattern map 400) to characterize the flow.

At block 1112, the flow is modeled based on the estimated pattern if it is determined that the characterized pattern matches the estimated pattern. Modeling the flow based on the estimated pattern may include determining a pressure gradient and/or a concentration of the cuttings in the flow.

At block 1114, a pump (e.g., pump 116) may be controlled to adjust a flow rate of drilling fluid to the wellbore to increase the flow in the annulus, if at least the determined pressure gradient falls below a first threshold or the determined concentration falls rises above a second threshold. Alternatively (or in addition)—at block 1116, the pump is controlled to adjust a flow rate of drilling fluid to the wellbore, in order to minimize an ECD.

Embodiments disclosed herein include:

A: A computing system includes a processor that estimates a pattern of the flow as a stationary bed flow, a dispersed flow, or a transitional flow that is relative to the stationary bed flow and the dispersed flow. The processor estimates a plurality of parameters based on the estimated pattern of the flow. The processor determines a plurality of dimensionless parameters, based on the estimated plurality of parameters. The dimensionless parameters include a first dimensionless parameter corresponding to an effect of turbulence on the flow and a second dimensionless parameter corresponding to an effect of gravity on the flow. The processor characterizes the pattern of the flow as the stationary bed flow, the dispersed flow, or the transitional flow, based on the determined dimensionless parameters. The processor models the flow based on the estimated pattern if it is determined that the characterized pattern matches the estimated pattern.

B: A method for determining characteristics of a flow of a mixture of drilling fluid and cuttings in an annulus of a wellbore includes estimating a pattern of the flow as a stationary bed flow, a dispersed flow, or a transitional flow that is relative to the stationary bed flow and the dispersed flow, and estimating a plurality of parameters based on the estimated pattern of the flow. The method further includes determining a plurality of dimensionless parameters, based on the estimated plurality of parameters. The dimensionless parameters include a first dimensionless parameter corresponding to an effect of turbulence on the flow and a second dimensionless parameter corresponding to an effect of gravity on the flow. The method further includes characterizing the pattern of the flow as the stationary bed flow, the dispersed flow, or the transitional flow, based on the determined dimensionless parameters, and modeling the flow based on the estimated pattern if it is determined that the characterized pattern matches the estimated pattern.

Each of the embodiments, A and B, may have one or more of the following additional elements in any combination. Element 1: further including a pump controllable by the processor, wherein the processor models the flow based on the estimated pattern by determining at least a pressure gradient or a concentration of the cuttings in the flow, and wherein the processor controls the pump to adjust a flow rate of drilling fluid to the wellbore to increase the flow in the annulus, if at least the determined pressure gradient falls below a first threshold or the determined concentration rises above a second threshold. Element 2: further including a pump controllable by the processor, wherein the processor models the flow based on the estimated pattern by determining a concentration of the cuttings in the flow, and wherein the processor controls the pump to adjust a flow rate of drilling fluid to the wellbore, in order to minimize an ECD. Element 3: wherein, if the estimated pattern is the stationary bed flow or the transitional flow, the processor further determines a deposition rate and a re-suspension rate of the cuttings in the annulus based on the estimated plurality of parameters, and wherein the processor determines the plurality of dimensionless parameters by determining the first dimensionless parameter and the second dimensionless parameter based on the estimated plurality of parameters if it is determined that the deposition rate and the re-suspension rate are balanced. Element 4: wherein, if the estimated pattern is the stationary bed flow or the transitional flow, the processor estimates the plurality of parameters by: estimating a height of a first layer of the flow, the first layer including a first portion of the drilling fluid and a first portion of the cuttings; and estimating a pressure gradient of the first layer of the flow. Element 5: wherein, if the estimated pattern is the stationary bed flow or the transitional flow, the processor estimates the plurality of parameters by: estimating a pressure gradient of a second layer of the flow, wherein the second layer includes a second portion of the drilling fluid and is free of the cuttings; and determining whether the pressure gradient of the first layer and the pressure gradient of the second layer are balanced. Element 6: wherein, if the estimated pattern is the stationary bed flow or the transitional flow, the processor further determines a deposition rate and a re-suspension rate of the cuttings in the annulus based on the estimated plurality of parameters if it is determined that the pressure gradient of the first layer and the pressure gradient of the second layer are balanced. Element 7: wherein the processor determines the plurality of dimensionless parameters by determining the first dimensionless parameter and the second dimensionless parameter based on the estimated plurality of parameters if it is determined that the deposition rate and the re-suspension rate are balanced. Element 8: wherein the value of the first dimensionless parameter is determined based on an expression:

$$\frac{u^*}{u_{settling} \cdot \sin\theta},$$

and
wherein $u^*$ denotes a friction velocity of the flow, $u_{settling}$ denotes a settling velocity of the cuttings, and $\theta$ denotes an angle at which the wellbore extends with respect to the direction of gravity. Element 9: wherein the value of the second dimensionless parameter is determined based on an expression:

$$\frac{u_f}{u_{settling} \cdot \sin\theta},$$

and
wherein $u_f$ denotes a fluid velocity of the flow.

Element 10: wherein modeling the flow based on the estimated pattern includes determining at least a pressure gradient or a concentration of the cuttings in the flow, and wherein the method further includes controlling a pump to adjust a flow rate of drilling fluid to the wellbore to increase the flow in the annulus, if at least the determined pressure gradient falls below a first threshold or the determined concentration rises above a second threshold. Element 11: wherein modeling the flow based on the estimated pattern comprises determining a concentration of the cuttings in the flow, and wherein the method further comprises controlling a pump to adjust a flow rate of drilling fluid to the wellbore, in order to minimize an ECD. Element 12: wherein, if the estimated pattern is the stationary bed flow or the transitional flow, the method further includes: determining a deposition rate and a re-suspension rate of the cuttings in the annulus based on the estimated plurality of parameters, wherein determining the plurality of dimensionless parameters comprises determining the first dimensionless parameter and the second dimensionless parameter based on the estimated plurality of parameters if it is determined that the deposition rate and the re-suspension rate are balanced. Element 13: wherein, if the estimated pattern is the stationary bed flow or the transitional flow, estimating the plurality of parameters includes: estimating a height of a first layer of the flow, the first layer including a first portion of the drilling fluid and a first portion of the cuttings; and estimating a pressure gradient of the first layer of the flow. Element 14: wherein, if the estimated pattern is the stationary bed flow or the transitional flow, estimating the plurality of parameters further includes: estimating a pressure gradient of a second layer of the flow, wherein the second layer includes a second portion of the drilling fluid and is free of the cuttings; and determining whether the pressure gradient of the first layer and the pressure gradient of the second layer are balanced. Element 15: wherein, if the estimated pattern is the stationary bed flow or the transitional flow, the method further includes: determining a deposition rate and a re-suspension rate of the cuttings in the annulus based on the estimated plurality of parameters if it is determined that the pressure gradient of the first layer and the pressure gradient of the second layer are balanced. Element 16: wherein determining the plurality of dimensionless parameters includes determining the first dimensionless parameter and the second dimensionless parameter based on the estimated plurality of parameters if it is determined that the deposition rate and the re-suspension rate are balanced. Element 17: wherein the value of the first dimensionless parameter is determined based on an expression:

$$\frac{u^*}{u_{settling} \cdot \sin\theta},$$

and
wherein $u^*$ denotes a friction velocity of the flow, $u_{settling}$ denotes a settling velocity of the cuttings, and $\theta$ denotes an angle at which the wellbore extends with respect to the direction of gravity. Element 18: wherein the value of the second dimensionless parameter is determined based on an expression:

$$\frac{u_f}{u_{settling} \cdot \sin\theta},$$

and
wherein $u_f$ denotes a fluid velocity of the flow.

Numerous variations and modifications will become apparent to those skilled in the art once the above disclosure is fully appreciated. The methods and systems can be used for determining characteristics of a flow of cuttings and drilling fluid mixture in an annular structure such as an annulus in a wellbore). However, it is understood that the disclosed methods and systems can be used for flows in structures of other shapes and forms. The ensuing claims are intended to cover such variations where applicable.

What is claimed is:
1. A method of flowing a flow of a mixture of drilling fluid and cuttings in an annulus of a wellbore, comprising:
   operating a pump to flow the mixture of drilling fluid and cuttings in the annulus of the wellbore;

estimating a pattern of the flow as a stationary bed flow, a dispersed flow, or a transitional flow that is relative to the stationary bed flow and the dispersed flow;

estimating a plurality of parameters based on the estimated pattern of the flow;

determining a plurality of dimensionless parameters comprising a first dimensionless parameter corresponding to an effect of turbulence on the flow and a second dimensionless parameter corresponding to an effect of gravity on the flow, based on the estimated plurality of parameters;

characterizing the pattern of the flow as the stationary bed flow, the dispersed flow, or the transitional flow, based on the determined plurality of dimensionless parameters;

modeling the flow based on the estimated pattern if it is determined that the characterized pattern matches the estimated pattern, wherein the modeling comprises determining at least a pressure gradient or a concentration of the cuttings in the flow; and controlling the pump to adjust a flow rate of drilling fluid into the wellbore to increase the flow in the annulus, when at least the determined pressure gradient falls below a first threshold or the determined concentration rises above a second threshold;

wherein the value of the first dimensionless parameter is determined based on an expression:

$$\frac{u^*}{u_{settling} \cdot \sin\theta},$$

and wherein $u^*$ denotes a friction velocity of the flow, $u_{settling}$ denotes a settling velocity of the cuttings, and θ denotes an angle at which the wellbore extends with respect to the direction of gravity; and wherein the value of the second dimensionless parameter is determined based on $$\frac{u_f}{u_{settling} \cdot \sin\theta},$$

and wherein $u_f$ denotes a fluid velocity of the flow.

2. The method of claim 1, wherein modeling the flow based on the estimated pattern comprises determining a concentration of the cuttings in the flow, and controlling the pump further comprises adjusting a flow rate of drilling fluid to the wellbore, in order to minimize an equivalent circulating density (ECD).

3. The method of claim 1, wherein, if the estimated pattern is the stationary bed flow or the transitional flow, the method further comprises:

determining a deposition rate and a re-suspension rate of the cuttings in the annulus based on the estimated plurality of parameters;

wherein determining the plurality of dimensionless parameters comprises determining the first dimensionless parameter and the second dimensionless parameter based on the estimated plurality of parameters if it is determined that the deposition rate and the re-suspension rate are balanced.

4. The method of claim 1, wherein, if the estimated pattern is the stationary bed flow or the transitional flow, estimating the plurality of parameters comprises:

estimating a height of a first layer of the flow, the first layer including a first portion of the drilling fluid and a first portion of the cuttings; and estimating a pressure gradient of the first layer of the flow.

5. The method of claim 4, wherein, if the estimated pattern is the stationary bed flow or the transitional flow, estimating the plurality of parameters further comprises:

estimating a pressure gradient of a second layer of the flow, wherein the second layer includes a second portion of the drilling fluid and is free of the cuttings; and determining whether the pressure gradient of the first layer and the pressure gradient of the second layer are balanced.

6. The method of claim 5, wherein, if the estimated pattern is the stationary bed flow or the transitional flow, the method further comprises:

determining a deposition rate and a re-suspension rate of the cuttings in the annulus based on the estimated plurality of parameters if it is determined that the pressure gradient of the first layer and the pressure gradient of the second layer are balanced.

7. The method of claim 6, wherein determining the plurality of dimensionless parameters comprises determining the first dimensionless parameter and the second dimensionless parameter based on the estimated plurality of parameters if it is determined that the deposition rate and the re-suspension rate are balanced.

8. A system for flowing a flow of a mixture of drilling fluid and cuttings in an annulus of a wellbore, comprising:

a processor that:

estimates a pattern of the flow as a stationary bed flow, a dispersed flow, or a transitional flow that is relative to the stationary bed flow and the dispersed flow;

estimates a plurality of parameters based on the estimated pattern of the flow;

determines a plurality of dimensionless parameters comprising a first dimensionless parameter corresponding to an effect of turbulence on the flow and a second dimensionless parameter corresponding to an effect of gravity on the flow, based on the estimated plurality of parameters;

characterizes the pattern of the flow as the stationary bed flow, the dispersed flow, or the transitional flow, based on the determined plurality of dimensionless parameters; and models the flow based on the estimated pattern by determining at least a pressure gradient or a concentration of the cuttings in the flow, if it is determined that the characterized pattern matches the estimated pattern; and a pump controllable by the processor to adjust a flow rate of drilling fluid to the wellbore to increase the flow in the annulus, if at least the determined pressure gradient falls below a first threshold or the determined concentration rises above a second threshold;

wherein the value of the first dimensionless parameter is determined based on an expression:

$$\frac{u^*}{u_{settling} \cdot \sin\theta},$$

and
wherein u* denotes a friction velocity of the flow, $u_{settling}$ denotes a settling velocity of the cuttings, and θ denotes an angle at which the wellbore extends with respect to the direction of gravity; and wherein the value of the second dimensionless parameter is determined based on an expression:

$$\frac{u_f}{u_{settling} \cdot \sin\theta},$$

and
wherein $u_f$ denotes a fluid velocity of the flow.

9. The system of claim 8, further comprising:
wherein the processor models the flow based on the estimated pattern by determining a concentration of the cuttings in the flow, and
wherein the processor controls the pump to adjust a flow rate of drilling fluid to the wellbore, in order to minimize an equivalent circulating density (ECD).

10. The system of claim 8,
wherein, if the estimated pattern is the stationary bed flow or the transitional flow, the processor further determines a deposition rate and a re-suspension rate of the cuttings in the annulus based on the estimated plurality of parameters, and
wherein the processor determines the plurality of dimensionless parameters by determining the first dimensionless parameter and the second dimensionless parameter based on the estimated plurality of parameters if it is determined that the deposition rate and the re-suspension rate are balanced.

11. The system of claim 8, wherein, if the estimated pattern is the stationary bed flow or the transitional flow, the processor estimates the plurality of parameters by:
estimating a height of a first layer of the flow, the first layer including a first portion of the drilling fluid and a first portion of the cuttings; and
estimating a pressure gradient of the first layer of the flow.

12. The system of claim 11, wherein, if the estimated pattern is the stationary bed flow or the transitional flow, the processor estimates the plurality of parameters by:
estimating a pressure gradient of a second layer of the flow, wherein the second layer includes a second portion of the drilling fluid and is free of the cuttings; and
determining whether the pressure gradient of the first layer and the pressure gradient of the second layer are balanced.

13. The system of claim 12, wherein, if the estimated pattern is the stationary bed flow or the transitional flow, the processor further determines a deposition rate and a re-suspension rate of the cuttings in the annulus based on the estimated plurality of parameters if it is determined that the pressure gradient of the first layer and the pressure gradient of the second layer are balanced.

14. The system of claim 13, wherein the processor determines the plurality of dimensionless parameters by determining the first dimensionless parameter and the second dimensionless parameter based on the estimated plurality of parameters if it is determined that the deposition rate and the re-suspension rate are balanced.

\* \* \* \* \*

UNITED STATES PATENT AND TRADEMARK OFFICE
CERTIFICATE OF CORRECTION

| | |
|---|---|
| PATENT NO. | : 11,746,608 B2 |
| APPLICATION NO. | : 16/091036 |
| DATED | : September 5, 2023 |
| INVENTOR(S) | : Feifei Zhang, Andrey Filippov and Jianxin Lu |

It is certified that error appears in the above-identified patent and that said Letters Patent is hereby corrected as shown below:

In the Claims

In Claim 1, Column 17, Line 40: "is determined based on" should read "is determined based on an expression:"

Signed and Sealed this
Tenth Day of October, 2023

*Katherine Kelly Vidal*

Katherine Kelly Vidal
*Director of the United States Patent and Trademark Office*